UNITED STATES PATENT OFFICE.

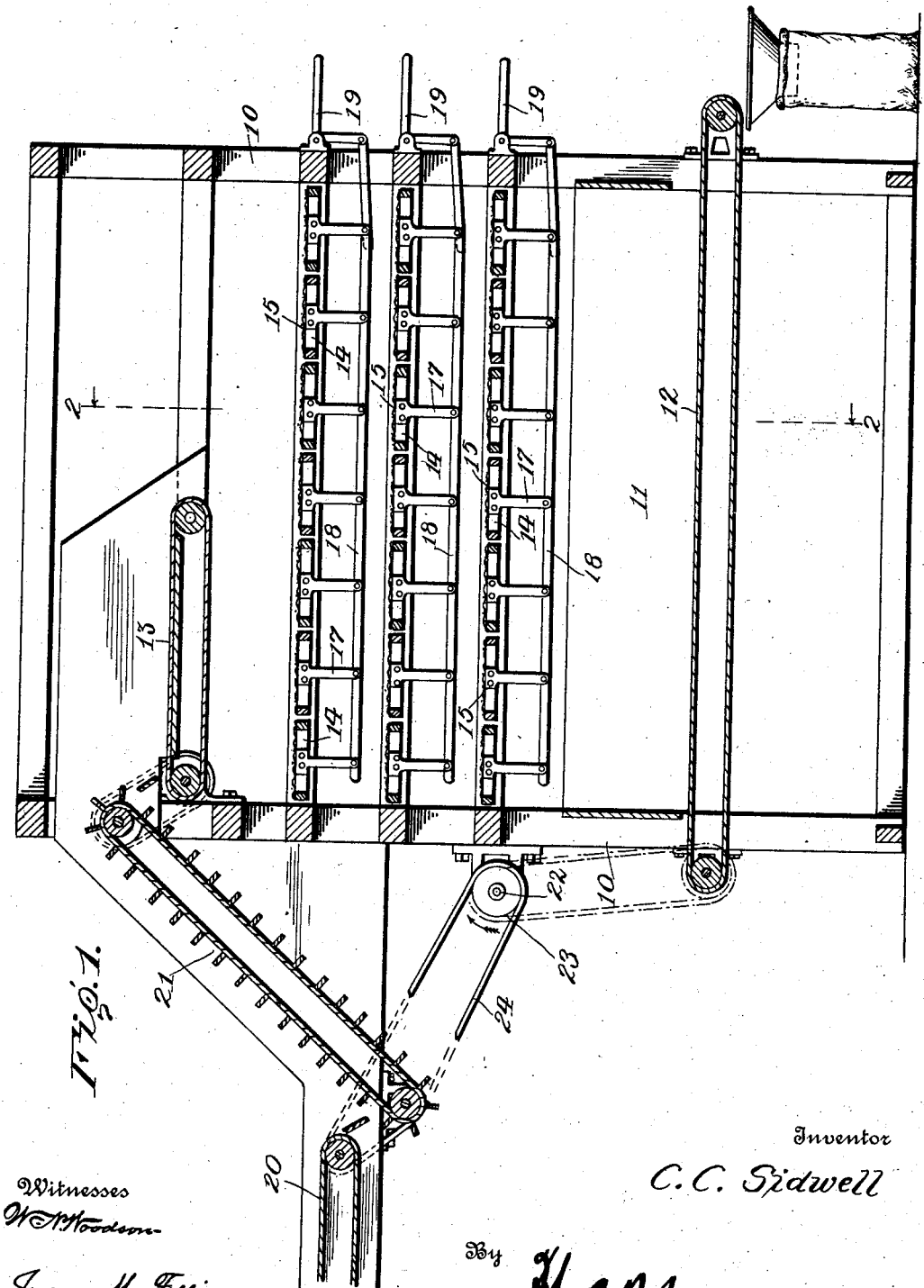

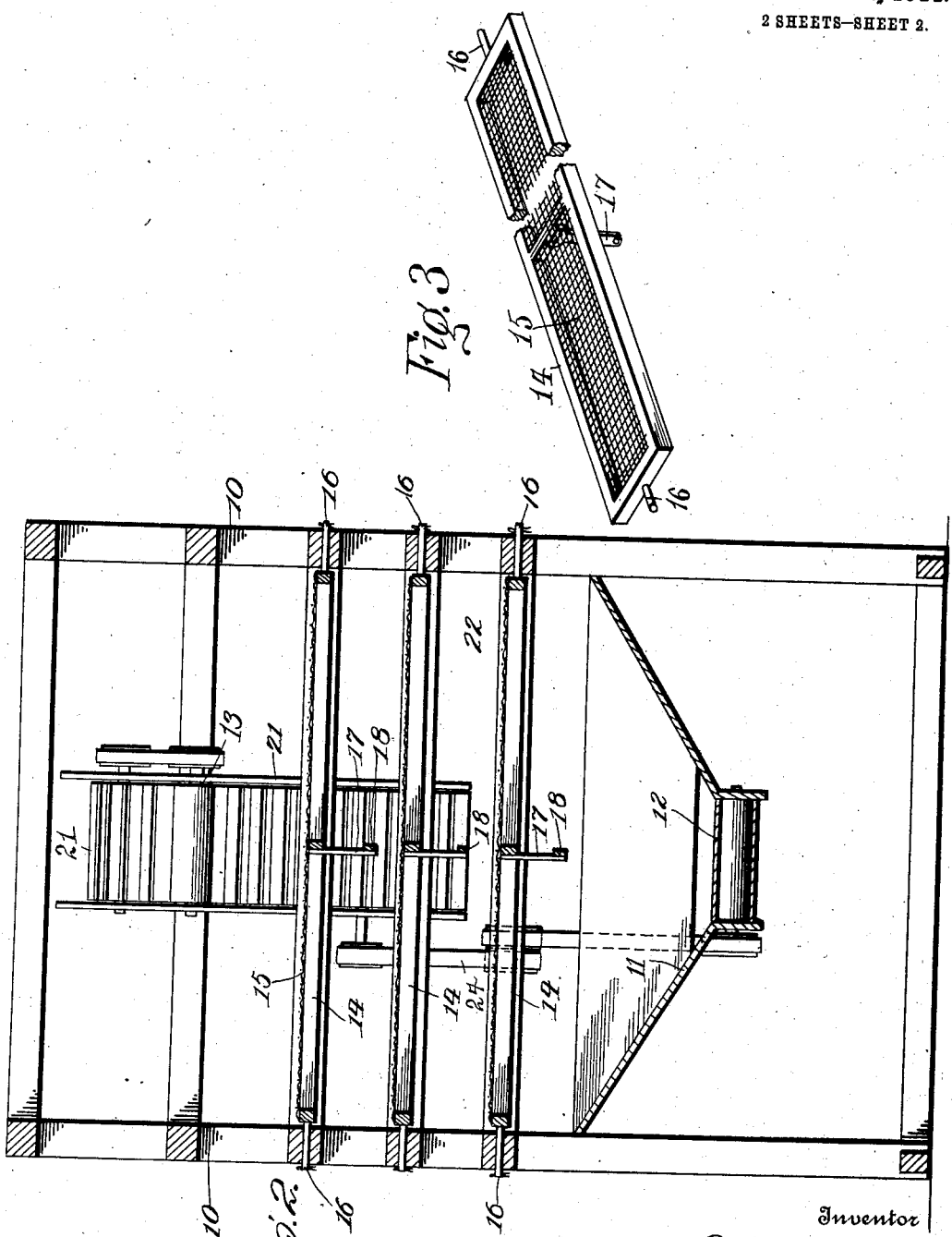

CHESTER C. SIDWELL, OF RIVERA, CALIFORNIA.

DRYING APPARATUS.

1,011,380.  Specification of Letters Patent.  Patented Dec. 12, 1911.

Application filed February 28, 1911. Serial No. 611,471.

*To all whom it may concern:*

Be it known that I, CHESTER C. SIDWELL, citizen of the United States, residing at Rivera, in the county of Los Angeles and State of California, have invented certain new and useful Improvements in Drying Apparatus, of which the following is a specification.

This invention relates to improvements in drying apparatus, more particularly to devices of this character employed for drying walnuts and similar products, and has for one of its objects to improve the construction and increase the efficiency and utility of devices of this character.

Another object of the invention is to provide a device of this character through which the product may be conducted and in which it is subjected continuously to the action of the air, and in which provision is also made for overturning the product at suitable intervals so that the air has free access thereto and the drying action thereby accelerated.

Another object of the invention is to provide a device through which the product may be conducted progressively with the undried product entering at one end and the completely dried product being discharged at the opposite end.

With these and other objects in view the invention consists in certain novel features of construction as hereinafter shown and described and then specifically pointed out in the claims.

The improved apparatus may be constructed of any required capacity and adapted without material structural changes to nuts, fruits, and like products of different kinds, but, as before stated, is designed more particularly for drying walnuts and like products, and for the purpose of illustrating the preferred embodiment of the invention an apparatus adapted for this special purpose is shown, and in the drawings thus employed:

Figure 1 is a side elevation, partly in section, of the improved apparatus; Fig. 2 is a transverse section on the line 2—2 of Fig. 1; and Fig. 3 is a detached perspective view of one of the movable trays.

Corresponding and like parts are referred to in the following description and indicated in all the views of the accompanying drawings by the same reference characters.

The improved apparatus embraces in its simpler form a plurality of trays or supports, preferably covered with wire netting so that the air will freely circulate through the product deposited upon the trays, and the trays arranged to be tilted to discharge the contents either into another similar series of trays in successive order or directly into a discharging mechanism, acording to the capacity of the apparatus.

Generally the trays will be arranged in series one above the other so that the contents of one series will be discharged upon the series next below and so on continuously, and in the drawings an apparatus is shown having three series of the trays arranged one above the other and supported in a suitable framework, the framework being preferably open to permit a free circulation of air above and below the trays.

The frame is represented as a whole at 10 and is formed with a hopper bottom 11 and an endless discharge conveyer belt 12 arranged at the bottom of the hopper. At its upper portion the framework 10 is provided with a distributing conveyer, of suitable construction, and represented conventionally at 13. The series of trays are precisely alike and the description of one will suffice for both.

Each of the trays comprises a rectangular frame 14, preferably covered with a wire netting, represented at 15, of suitable mesh, the size of the mesh corresponding to the product which is to be handled. When employed for drying walnuts the wire netting known as "Number 2 market" will be employed for this purpose. The frames 14 may be of any required size, but will ordinarily be about one foot wide and about ten feet long, arranged side by side, and each tray provided with pins 16 at the ends bearing in the members of the frame 10 so that the trays may be tilted sufficiently to permit the contents to be discharged. Any suitable means may be employed for tilting the trays, but for the purpose of illustration each tray is shown provided with a depending standard 17, the standards of each row of trays being coupled by links 18, and the terminal link extended and connected to a bell crank lever 19 connected to the frame 10, preferably externally thereof as shown in Fig. 1. By this simple arrangement all of the trays of each series may be simultaneously tilted to discharge their contents. For the purpose of illustration three series of trays are shown and each provided with its independent tilting mechanism.

Any suitable means may be employed for supplying the product to the trays, but for the purpose of illustration a horizontal feed belt 20 is shown in position to convey the product to an elevating device 21 which deposits the product upon the distributing belt 13.

Any suitable means may be employed for actuating the various belts, but for the purpose of illustration a shaft 22 is shown provided with a drive pulley 23 over which a drive belt 24 is conducted. The shaft 22 is likewise provided with various belt pulleys from which belts lead to the various conveyers, so that one shaft is employed to operate all of the belts.

With a device thus constructed the operation is as follows: The product is fed to the belt 13 and distributed thereby to the upper series of trays and permitted to remain thereon until partially dried. The upper crank 19 is then actuated to overturn the upper row of trays and deposit their contents simultaneously upon the next row of trays below. The upper row of trays is then supplied with another quantity of the product, and when the contents of the second tray have been sufficiently dried the second crank 19 is actuated to deposit the product upon the third tray, and the second row of trays returned to their horizontal position. The contents of the upper series of trays are then discharged upon the second series of trays and the upper series of trays again supplied with the undried product. When the product is fully dried upon the lower series of trays it is discharged upon the belt 12 and conveyed thereby away from the machine into the sacks or other receptacles. By this means a substantially continuous operation is possible with the improved apparatus, thereby materially expediting the process and correspondingly increasing the capacity of the apparatus.

Having thus described the invention what I claim as new is:—

1. The combination with a supporting frame having vertical walls formed of horizontal rails spaced apart, of a plurality of trays mounted for tilting on said rails and arranged in superimposed series, independent means for tilting said trays, means for supplying a product to the upper series of trays, and means for conducting the product from the trays of the final series, the air freely circulating over and between the series of trays and through the product when the same is passing downwardly through the series of trays.

2. An apparatus of the class described comprising a supporting frame including horizontal rails spaced apart and with open spaces between them, a plurality of trays mounted for oscillation on said rails and arranged in superimposed series and in position for the free circulation of air above and below the trays, independent means for actuating the trays of each series to discharge their contents upon the trays of the next series below, a conveyer belt extending partly over the upper series of the trays and discharging midway of the same to distribute the material uniformly.

In testimony whereof, I affix my signature in presence of two witnesses.

CHESTER C. SIDWELL. [L. S.]

Witnesses:
Gus. E. Triggs,
Geo. W. Ellis.

---

Copies of this patent may be obtained for five cents each, by addressing the "Commissioner of Patents, Washington, D. C."